(12) United States Patent
Zhang

(10) Patent No.: US 12,157,399 B2
(45) Date of Patent: Dec. 3, 2024

(54) METHOD AND APPARATUS FOR CONTROLLING ENERGY RECOVERY, CONTROLLER, AND ELECTRIC VEHICLE

(71) Applicant: Great Wall Motor Company Limited, Baoding (CN)

(72) Inventor: Junwei Zhang, Hebei (CN)

(73) Assignee: Great Wall Motor Company Limited, Baoding (CN)

( * ) Notice: Subject to any disclaimer, the term of this patent is extended or adjusted under 35 U.S.C. 154(b) by 377 days.

(21) Appl. No.: 17/639,197

(22) PCT Filed: Sep. 24, 2020

(86) PCT No.: PCT/CN2020/117489
§ 371 (c)(1),
(2) Date: Feb. 28, 2022

(87) PCT Pub. No.: WO2021/057854
PCT Pub. Date: Apr. 1, 2021

(65) Prior Publication Data
US 2022/0324331 A1   Oct. 13, 2022

(30) Foreign Application Priority Data

Sep. 24, 2019 (CN) .......................... 201910907115.1

(51) Int. Cl.
*G06F 17/00* (2019.01)
*B60L 7/18* (2006.01)
(52) U.S. Cl.
CPC ............. *B60L 7/18* (2013.01); *B60L 2240/12* (2013.01); *B60L 2240/423* (2013.01)
(58) Field of Classification Search
CPC .................. B60L 7/18; B60L 2240/12; B60L 2240/423; B60L 2240/16; B60L 2250/26;
(Continued)

(56) References Cited

U.S. PATENT DOCUMENTS 7,828,693 B2 * 11/2010 Soliman ................ B60W 10/06
477/3
9,481,251 B2 * 11/2016 Huh ...................... B60W 20/00
(Continued)

FOREIGN PATENT DOCUMENTS

CN          102826087 A       12/2012
CN          103359116 A       10/2013
(Continued)

OTHER PUBLICATIONS

Research on Braking Energy Regeneration for Hybrid Electric Vehicles (Year: 2022).*
(Continued)

*Primary Examiner* — Ronnie M Mancho
(74) *Attorney, Agent, or Firm* — Renner, Otto, Boisselle & Sklar, LLP

(57) ABSTRACT

The present application provides a method and an apparatus for controlling energy recovery, a controller, and an electric vehicle. The method includes: determining whether an electric vehicle is in a coasting energy recovery mode or a braking energy recovery mode; acquiring an energy recovery torque of the electric vehicle if the electric is in the coasting energy recovery mode or the braking energy recovery mode; and sending the energy recovery torque to a motor controller of the electric vehicle, whereby allowing the motor controller to control a motor of the electric vehicle to charge a battery of the electric vehicle. The method provided by embodiments of the present application can solve the problem that the method for controlling energy recovery in the prior art is difficult to reach a maximum energy recovery.

17 Claims, 8 Drawing Sheets

(58) Field of Classification Search
CPC .... B60L 2260/24; B60L 2260/26; B60L 7/10; B60L 15/20; B60L 2240/42
USPC .......................................................... 701/22
See application file for complete search history.

(56) References Cited

U.S. PATENT DOCUMENTS

| | | | | |
|---|---|---|---|---|
| 9,573,585 | B2* | 2/2017 | Severinsky | B60L 50/61 |
| 9,834,199 | B2* | 12/2017 | Yoon | G08G 1/09623 |
| 10,106,166 | B2* | 10/2018 | Orita | B60W 30/20 |
| 10,336,314 | B2* | 7/2019 | Lee | B60K 6/48 |
| 10,556,582 | B2* | 2/2020 | Lee | B60W 10/06 |
| 10,882,512 | B2* | 1/2021 | Kobler | B60K 6/40 |
| 10,921,145 | B2* | 2/2021 | Son | B60K 6/48 |
| 2009/0298641 | A1* | 12/2009 | Boot | B60W 10/196 477/4 |
| 2013/0119665 | A1* | 5/2013 | Berbari | B60L 58/20 290/50 |
| 2014/0265560 | A1* | 9/2014 | Leehey | B60L 58/13 307/10.1 |
| 2018/0237023 | A1* | 8/2018 | Orita | B60W 30/20 |
| 2018/0297577 | A1* | 10/2018 | Lee | B60W 10/08 |
| 2018/0362020 | A1* | 12/2018 | Kobler | B60K 6/28 |
| 2019/0077258 | A1* | 3/2019 | Cho | B60K 6/52 |
| 2019/0178662 | A1* | 6/2019 | Son | B60K 6/387 |
| 2020/0017097 | A1* | 1/2020 | Money | B60L 7/14 |
| 2020/0216087 | A1* | 7/2020 | Kim | B60W 10/196 |
| 2020/0361461 | A1* | 11/2020 | Eo | B60K 6/387 |
| 2020/0391741 | A1* | 12/2020 | Son | B60W 20/20 |

FOREIGN PATENT DOCUMENTS

| | | | | |
|---|---|---|---|---|
| CN | 104828073 | A | | 8/2015 |
| CN | 103921795 | A | | 4/2016 |
| CN | 106375145 | A * | 2/2017 | ........... B60R 16/023 |
| CN | 106965697 | A * | 7/2017 | .............. B60L 53/00 |
| CN | 206734088 | A | | 12/2017 |
| CN | 109017437 | A | | 12/2018 |
| CN | 109591605 | A | | 4/2019 |
| CN | 109649183 | A | | 4/2019 |
| CN | 109677393 | A | | 4/2019 |
| CN | 110466486 | A * | 11/2019 | ........... B60T 13/142 |
| CN | 111791711 | A * | 10/2020 | ............. B60L 15/20 |
| CN | 109747616 | B * | 12/2020 | |
| CN | 111791711 | B * | 12/2021 | ............. B60L 15/20 |
| CN | 106965697 | B * | 8/2023 | .............. B60L 53/00 |
| DE | 102004061263 | A1 | | 7/2006 |
| JP | 2009029413 | A | | 2/2009 |
| JP | 6479760 | B2 * | 3/2019 | ............... B60L 1/003 |
| WO | WO-2021057854 | A1 * | 4/2021 | ............. B60L 15/20 |

OTHER PUBLICATIONS

International Search Report for related International Application No. PCT/CN2020/117489 mailed Dec. 3, 2020.

* cited by examiner collecting, by the vehicle control unit, second driving state parameters of the electric vehicle if the electric vehicle is in the coasting energy recovery mode or the braking energy recovery mode, where the second driving state parameters comprises: an accelerator opening degree signal, an energy recovery strength signal, a driving mode signal, and a vehicle speed signal — S501 searching, by the vehicle control unit, according to the second driving state parameters, in a preset table of coasting energy recovery torques for a coasting energy recovery torque corresponding to the second driving state parameters, if the electric vehicle is in the coasting energy recovery mode — S502 searching, by the vehicle control unit, according to the second driving state parameters, in a preset table of braking energy recovery torques for a braking energy recovery torque corresponding to the second driving state parameters, if the electric vehicle is in the braking energy recovery mode and the electric vehicle is in the absence of the electronic stability program — S503 receiving, by the vehicle control unit, the braking energy recovery torque sent from the electronic stability , if the electric vehicle is in the braking energy recovery mode and the electric vehicle contains the electronic stability program — S504

FIG. 5

METHOD AND APPARATUS FOR CONTROLLING ENERGY RECOVERY, CONTROLLER, AND ELECTRIC VEHICLE

CROSS-REFERENCE TO RELATED APPLICATIONS

This application is the U.S. national phase of International Application No. PCT/CN2020/117489 with an international filing date of Sep. 24, 2020, designating the U.S., now pending, and further claims priority benefits to Chinese Patent Application No. 201910907115.1 filed Sep. 24, 2019. The contents of all of the aforementioned applications, including any intervening amendments thereto, are incorporated herein by reference.

TECHNICAL FIELD

Embodiments of the present application relates to the technical field of the electronic vehicle, and more particularly to a method and an apparatus for controlling energy recovery, a controller, and an electric vehicle.

BACKGROUND

With the annual growth rate of tens of millions of cars in the world, the proven oil reserves on the earth will be exhausted within limited years. At the same time, a large amount of toxic and harmful gases generated from the combustion of fuel oil in vehicles have also caused great damage to the atmospheric environment, and its threat to human health has become a global disaster. Therefore, the development of pure electric vehicle is an inevitable trend of the development of the transportation industry and a general trend of the development of the automobile industry.

With the increasingly serious problems of environmental pollution and energy shortage, the electric vehicle has become a new hot spot in the development of automobiles due to its advantages of cleanliness, no pollution, high energy efficiency, and diversified energy sources. However, the short driving range seriously hinders the popularization of the electric vehicle. Therefore, energy recovery technology, which is one of the means to reduce the electric vehicle's energy consumption and improve its driving range, has become a hot spot in the electric vehicle research field. The braking energy recovery is one of the important technologies of the modern electric vehicle and hybrid vehicle. In a general internal combustion engine vehicle, when the electric vehicle decelerates and brakes, the motion energy of the electric vehicle is converted into heat energy and released into the atmosphere. In the electric vehicle and hybrid vehicle, this wasted motion energy can be converted into electrical energy through braking energy recovery technology and stored in the battery, and further converted into the driving energy. For example, when the electric vehicle starts or accelerates, when the driving force is to be increased, the driving force of the motor becomes an auxiliary power of the engine, so that the electric energy can be effectively used. However, it is difficult for the current control system of the braking energy recovery to achieve the maximum energy recovery.

Therefore, it is difficult for the existing energy recovery control methods to achieve the maximum energy recovery.

SUMMARY

Embodiments of the present application provides a method and an apparatus for controlling energy recovery, a controller, and an electric vehicle, so as to tackle the problem that the existing energy recovery control methods are unable to achieve the maximum energy recovery.

In a first aspect, embodiments of the present application provide a method for controlling energy recovery. The method comprises: determining whether an electric vehicle is in a coasting energy recovery mode or a braking energy recovery mode; acquiring an energy recovery torque of the electric vehicle if the electric is in the coasting energy recovery mode or the braking energy recovery mode; and sending the energy recovery torque to a motor controller of the electric vehicle, whereby allowing the motor controller to control a motor of the electric vehicle to charge a battery of the electric vehicle.

In a possible implementation, said determining whether an electric vehicle is in a coasting energy recovery mode or a braking energy recovery mode comprises: determining whether the electric vehicle is in a coasting mode or a braking mode, wherein the coasting mode is a mode where neither brake signal nor acceleration signal is received, and the braking mode is a mode where the brake signal is received and no acceleration signal is received; collecting first driving state parameters of the electric vehicle, if the electric vehicle is in the coasting mode or the braking mode; determining that the electric vehicle is in the coasting energy recovery mode, if the first driving state parameters satisfy a first preset condition; and determining that the electric vehicle is in the braking energy recovery mode, if the first driving state parameters satisfy a second preset condition.

If the electric vehicle does not contain an electronic stability program, the first driving state parameters comprise: a fault level, a vehicle speed, a vehicle driving direction, a gear direction, and a brake pedal opening degree; the first preset condition is as follows: the fault level is level 2 or below, a gear is a forward gear, a vehicle speed is within a range of a first preset threshold, and the vehicle driving direction is consistent with the gear direction; and the second preset condition is as follows: the fault level is level 2 or below, the gear is the forward gear, the vehicle speed is within a range of a second preset threshold, the vehicle driving direction is consistent with the gear direction, and the brake pedal opening degree is within a range of a third preset threshold.

If the electric vehicle contains the electronic stability program, the first driving state parameters comprise: the fault level, a state of the electronic stability program, the vehicle speed, the vehicle driving direction, the gear direction, and the brake pedal opening degree; the first preset condition is as follows: the fault level is level 2 or below, the electronic stability program is in an inactivated sate, the gear is the forward gear, the vehicle speed is within the range of the first preset threshold, and the vehicle driving direction is consistent with the gear direction; and the second preset condition is as follows: the fault level is level 2 or below, the electronic stability program is in the inactivated sate, the gear is the forward gear, the vehicle speed is within the range of the second preset threshold, the vehicle driving direction is consistent with the gear direction, and the brake pedal opening degree is within the range of the third preset threshold.

In a possible implementation, said acquiring an energy recovery torque of the electric vehicle if the electric is in the coasting energy recovery mode or the braking energy recovery mode comprises: collecting second driving state parameters of the electric vehicle if the electric vehicle is in the coasting energy recovery mode or the braking energy recovery mode, wherein the second driving state parameters comprises: an accelerator opening degree signal, an energy recovery strength signal, a driving mode signal, and a vehicle speed signal; and determining the energy recovery torque according to any one of the following:

searching, according to the second driving state parameters, in a preset table of coasting energy recovery torques for a coasting energy recovery torque corresponding to the second driving state parameters as the energy recovery torque, if the electric vehicle is in the coasting energy recovery mode;

searching, according to the second driving state parameters, in a preset table of braking energy recovery torques for a braking energy recovery torque corresponding to the second driving state parameters as the energy recovery torque, if the electric vehicle is in the braking energy recovery mode and the electric vehicle is in the absence of the electronic stability program;

receiving the braking energy recovery torque sent from the electronic stability program as the energy recovery torque, if the electric vehicle is in the braking energy recovery mode and the electric vehicle contains the electronic stability program; and superimposing the braking energy recovery torque on the coasting energy recovery torque as the energy recovery torque, if the electric vehicle enters the braking energy recovery mode from the coasting energy recovery mode state.

In a possible implementation, said superimposing the braking energy recovery torque on the coasting energy recovery torque comprises: gradually superimposing a constantly generated braking energy recovery torque on a coasting energy recovery torque having been generated, along with generation of the braking energy recovery torque.

In a possible implementation, if the electric vehicle is in the braking energy recovery mode and the electric vehicle contains an electronic stability program, after sending the energy recovery torque to the motor controller of the electric vehicle, the method further comprises: receiving a current actual motor torque fed back by the motor controller; acquiring a matching accelerator pedal torque from a preset table of accelerator pedal torques according to an accelerator pedal opening degree signal and a vehicle speed signal, if the current actual motor toque is smaller than a preset torque value; determining a current energy recovery torque according to the current actual motor toque and the accelerator pedal torque; sending the current energy recovery torque to the electronic stability program, whereby allowing the electronic stability program to regulate the current energy recovery torque and to feed back a regulated current energy recovery torque; and ending the regulated current energy recovery torque to the motor controller of the electric vehicle, whereby allowing the motor controller to control the motor of the electric vehicle to charge the battery of the electric vehicle.

In a possible implementation, the current energy recovery torque is an absolute value of a difference between the current motor torque and the accelerator pedal torque.

In a possible implementation, the coasting energy recovery mode and the braking energy recovery mode are configured with different levels of energy recovery associated with a vehicle speed and a brake pedal opening degree.

In a second aspect, embodiments of the present application provide an apparatus for controlling energy recovery. The apparatus comprises: a determination module, configured for determining whether an electric vehicle is in a coasting energy recovery mode or a braking energy recovery mode; an energy recovery torque acquisition module, configured for acquiring an energy recovery torque of the electric vehicle if the electric is in the coasting energy recovery mode or the braking energy recovery mode; and a sending module, configured for sending the energy recovery torque to a motor controller of the electric vehicle, whereby allowing the motor controller to control a motor of the electric vehicle to charge a battery of the electric vehicle.

In a possible implementation, the determination module is further configured for: determining whether the electric vehicle is in a coasting mode or a braking mode, wherein the coasting mode is a mode where neither brake signal nor acceleration signal is received, and the braking mode is a mode where the brake signal is received and no acceleration signal is received; collecting first driving state parameters of the electric vehicle, if the electric vehicle is in the coasting mode or the braking mode; determining that the electric vehicle is in the coasting energy recovery mode, if the first driving state parameters satisfy a first preset condition; and determining that the electric vehicle is in the braking energy recovery mode, if the first driving state parameters satisfy a second preset condition;

In a possible implementation, the energy recovery torque acquisition module is specifically configured for: collecting second driving state parameters of the electric vehicle if the electric vehicle is in the coasting energy recovery mode or the braking energy recovery mode, wherein the second driving state parameters comprises: an accelerator opening degree signal, an energy recovery strength signal, a driving mode signal, and a vehicle speed signal; and determining the energy recovery torque according to any one of the following:

searching, according to the second driving state parameters, in a preset table of coasting energy recovery torques for a coasting energy recovery torque corresponding to the second driving state parameters as the energy recovery torque, if the electric vehicle is in the coasting energy recovery mode;

searching, according to the second driving state parameters, in a preset table of braking energy recovery torques for a braking energy recovery torque corresponding to the second driving state parameters as the energy recovery torque, if the electric vehicle is in the braking energy recovery mode and the electric vehicle is in the absence of the electronic stability program;

receiving the braking energy recovery torque sent from the electronic stability program as the energy recovery torque, if the electric vehicle is in the braking energy recovery mode and the electric vehicle contains the electronic stability program; and superimposing the braking energy recovery torque on the coasting energy recovery torque as the energy recovery torque, if the electric vehicle enters the braking energy recovery mode from the coasting energy recovery mode state.

In a possible implementation, the apparatus for controlling energy recovery further comprises: a receiver module, configured for receiving a current actual motor torque fed back by the motor controller; an accelerator pedal torque acquisition module, configured for acquiring a matching accelerator pedal torque from a preset table of accelerator pedal torques according to an accelerator pedal opening degree signal and a vehicle speed signal, when the current actual motor toque is smaller than a preset torque value; a current energy recovery torque determination module, configured for determining a current energy recovery torque according to the current actual motor toque and the accelerator pedal torque; a feedback module, configured for sending the current energy recovery torque to the electronic stability program, whereby allowing the electronic stability program to regulate the current energy recovery torque and to feed back a regulated current energy recovery torque; and a processing module, configured for sending the regulated current energy recovery torque to the motor controller of the electric vehicle, whereby allowing the motor controller to control the motor of the electric vehicle to charge the battery of the electric vehicle.

In a third aspect, embodiments of the present application provides a machine-readable storage medium, storing instructions configured to cause a machine to execute the method for controlling energy recovery as described in the above.

In a fourth aspect, embodiments of the present application provide a controller, configured for executing the method for controlling energy recovery as described in the first aspect and the possible implementations of the first aspect.

In a fifth aspect, embodiments of the present application provide an electric vehicle, comprising the controller as described in the third aspect.

In the method and the apparatus for controlling the energy recovery, the controller, and the electric vehicle provided by embodiments of the present application, in order to effectively convert the wasted motion energy into electricity via the braking energy recovery technology and store in the battery the electricity, which is further converted into a driving energy, it is firstly determined whether the electric vehicle is in the coasting energy recovery mode or the braking energy recovery mode. Only when the electric vehicle enters the energy recovery mode, the energy recovery can be better performed. In order to tackle the problem that the existing energy recovery control method is difficult to maximize the energy recovery, after the entry of the energy recovery mode, if the electric vehicle is in the coasting energy recovery mode or the braking energy recovery mode, for the purpose of allowing the motor controller to control the motor of the electric vehicle to charge the battery of the electric vehicle and effectively combining both the coasting and the braking energy recovery modes to maximize the energy recovery, it is required to obtain the energy recovery torque of the electric vehicle, and the energy recovery torque is then sent to the motor controller of the electric vehicle, so that the motor controller controls the electric motor of the electric vehicle to charge the battery of the electric vehicle. By determining whether the electric vehicle is in the coasting energy recovery mode or the braking energy recovery mode, this technical solution can better combine both the coasting and braking energy recovery modes, thus maximizing the energy recovery.

BRIEF DESCRIPTION OF THE DRAWINGS

In order to illustrate embodiments of the present application or technical solutions of the existing technology more clearly, accompanying drawings used in the description of the embodiments or the existing technology will be briefly introduced hereinbelow. Obviously, the accompanying drawings in the following description are some embodiments of the present application, and for those of ordinary skill in the art, other drawings can also be obtained from these drawings without any creative effort.

FIG. 5 is a schematic diagram of a method for controlling energy recovery provided by still another embodiment of the present application;

DETAILED DESCRIPTION OF THE MEBODIMENTS

In order to make the purposes, technical solutions, and advantages of the embodiments of the present application clearer, the technical solutions in the embodiments of the present application will be described clearly and completely below with reference to the drawings in the embodiments of the present application. Obviously, the described embodiments are a part of the embodiments of the present application, but not all of the embodiments. Based on the embodiments in the present application, all other embodiments obtained by those of ordinary skill in the art without creative work fall within the protection scope of the present application.

The terms "first", "second", "third", "fourth", etc. (if any) in the description and claims and the above-mentioned drawings of the present application are used to distinguish similar objects and are not necessarily used to describe a particular order or sequence. It is to be understood that the number used in this way are interchangeable under appropriate circumstances, so that the embodiments of the present application described herein, for example, can be implemented in sequences other than those illustrated or described herein. Furthermore, the terms "comprising" and "having" and any variations thereof, are intended to cover non-exclusive inclusion, for example, a process, method, system, product, or device comprising a series of steps or units is not necessarily limited to those expressly listed, rather, those steps or units may include other steps or units not expressly listed or inherent to this process, method, product, or device.

In the existing electric vehicle and the hybrid vehicle, a wasted motion energy can be converted into an electric energy through the braking energy recovery technology and stored in the battery, and further converted into a driving energy.

In the above, energy recovery means that during the driving process, the vehicle recycles an excess energy consumed during the deceleration process, thereby reducing the energy loss of the vehicle, and charging the vehicle battery to improve the driving range of the pure electric vehicle.

Energy recovery principle is as follows: 1. when the motor power is negative, the motor generates electricity, P=T*n/9.55;

in which, P represents a motor power (W); T represents a motor torque (Nm); and n represents a motor speed (rpm).

If P is positive, the motor outputs power to drive the wheels; and if P is negative, the motor generates electricity. During forward and braking conditions of a driving/forward gear, that is, a D gear, n maintains a positive value in the formula, so when the motor torque is positive, the motor drives; and when the motor torque is negative, the motor generates electricity.

Figure 1:
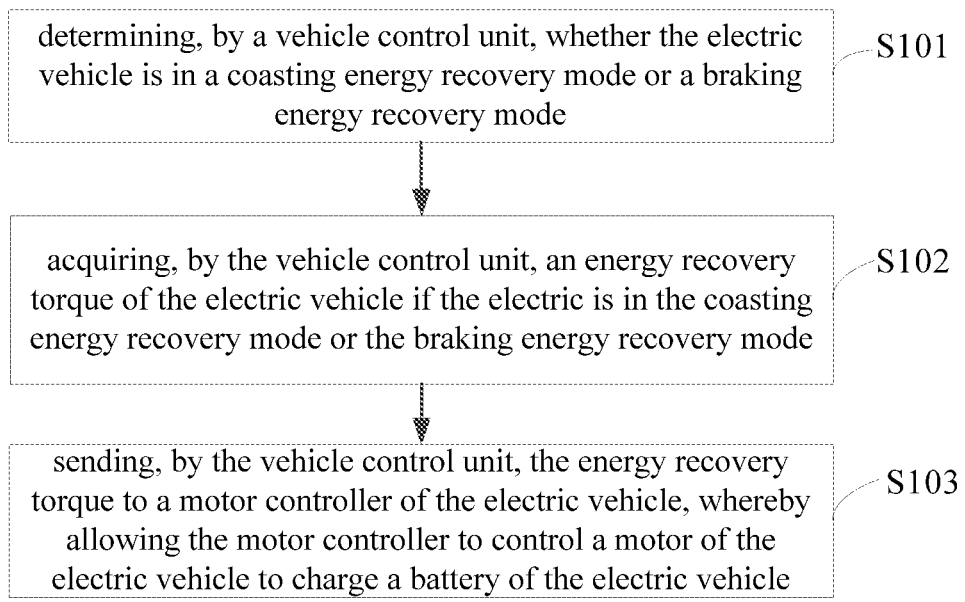
FIG. 1 is a schematic flowchart of a method for controlling energy recovery provided by an embodiment of the present application.

In order to maximize the energy recovery, the present application combines the braking energy recovery mode and the coasting energy recovery mode. Referring to FIG. 1, which is a schematic flowchart of a method for controlling energy recovery provided by embodiments of the present application. The method comprises steps S101, S102, and S103.

In step S101, it is determined whether an electric vehicle is in a coasting energy recovery mode or a braking energy recovery mode.

In this embodiment, energy recovery is divided into a coasting energy recovery mode and the braking energy recovery mode, according to different pedal states during vehicle energy recovery. The coasting energy recovery mode means that during the driving, when the driver releases the accelerator and does not step on the brake pedal, the vehicle may control the motor to rotate reversely thereby achieving the purpose of charging the battery. The braking energy recovery mode means that during the driving, when the driver releases the accelerator and depresses the brake pedal, the vehicle may control the motor to rotate reversely thereby achieving the purpose of charging the battery. Herein, the vehicle may refer to the electric vehicle, but is not limited to the electric vehicle.

The implementation body may be the core vehicle control unit (VCU) in the electric vehicle that realizes the whole vehicle control decision. The VCU judges the driver's driving intention by collecting signals such as the accelerator pedal, a gear position, and the brake pedal. By monitoring the vehicle status (such as the vehicle speed, the temperature, and the like) information, and after judgment and processing by the VCU, the vehicle operation status control command is sent to a power system and a power battery system, and a working mode of the power system of the vehicle accessories is controlled at the same time, thus, the VCU has the whole vehicle system fault diagnosis protection function and storage function. Therefore, it can be determined whether the electric vehicle is in the coasting energy recovery mode or the braking energy recovery mode through the VCU.

In step S102, if the electric is in the coasting energy recovery mode or the braking energy recovery mode, an energy recovery torque of the electric vehicle is acquired.

In this embodiment, regardless of whether the electric vehicle is in the coasting energy recovery mode or the braking energy recovery mode, the energy recovery torque can be generated. And when the coasting energy recovery torque is generated, the energy recovery torque can be searched out from a MAP toll in MATLAB software according to the accelerator pedal opening degree signal, an energy recovery strength signal, a driving mode signal, and a vehicle speed signal received by the VCU.

When the electric vehicle is in the coasting energy recovery mode, the energy recovery torque obtained by looking up the table is output or displayed on a dashboard of the electric vehicle. When the electric vehicle enters the braking energy recovery mode from the coasting energy recovery mode, the energy recovery torque is formed by gradually imposing the braking energy recovery torque generated during the braking energy recovery onto the coasting energy recovery torque having been generated in the coasting energy recovery mode, thus avoiding applying a sudden braking energy recovery torque to the motor, which would otherwise cause the instability of the vehicle and the safety of the vehicle may not be effectively ensured. Therefore, in embodiments of the present application, the coasting energy recovery mode and the braking energy recovery mode of the electric vehicle are effectively combined, which may ensure the stability and the safety of the vehicle.

In step S103, the energy recovery torque is sent to a motor controller of the electric vehicle, whereby allowing the motor controller to control a motor of the electric vehicle to charge a battery of the electric vehicle.

In this embodiment, the energy recovery torque acquired or received by the VCU are sent from the VCU to the motor controller of the electric vehicle in real time, and the motor of the electric vehicle is controlled by the motor controller to execute the energy recovery torque, so as to charge the battery of the electric vehicle. The motor controller can also feed back the actual energy recovery torque to the VCU in real time, and the VCU can feed back or adjust the received various signals according to the actual energy recovery torque, so that the energy recovery torque sent to the motor controller for execution can effectively charge the electric vehicle, thereby saving energy, maximizing the energy recovery, and improving the driving range of the pure electric vehicle.

In this embodiment, it is firstly determined whether the electric vehicle is in the coasting energy recovery mode or the braking energy recovery mode. Only when the electric vehicle enters the energy recovery mode, the energy recovery can be better performed. If the electric vehicle is in the coasting energy recovery mode or the braking energy recovery mode, the energy recovery torque of the electric vehicle is obtained, the energy recovery torque is sent to the motor controller of the electric vehicle, so that the motor controller controls the electric motor of the electric vehicle to charge the battery of the electric vehicle. In this way, both the coasting and braking energy recovery modes can be better combined, so as to maximize the energy recovery. By determining whether the electric vehicle is in the coasting energy recovery mode or the braking energy recovery mode, this technical solution can better combine both the coasting and braking energy recovery modes, thus maximizing the energy recovery.

Figure 2:
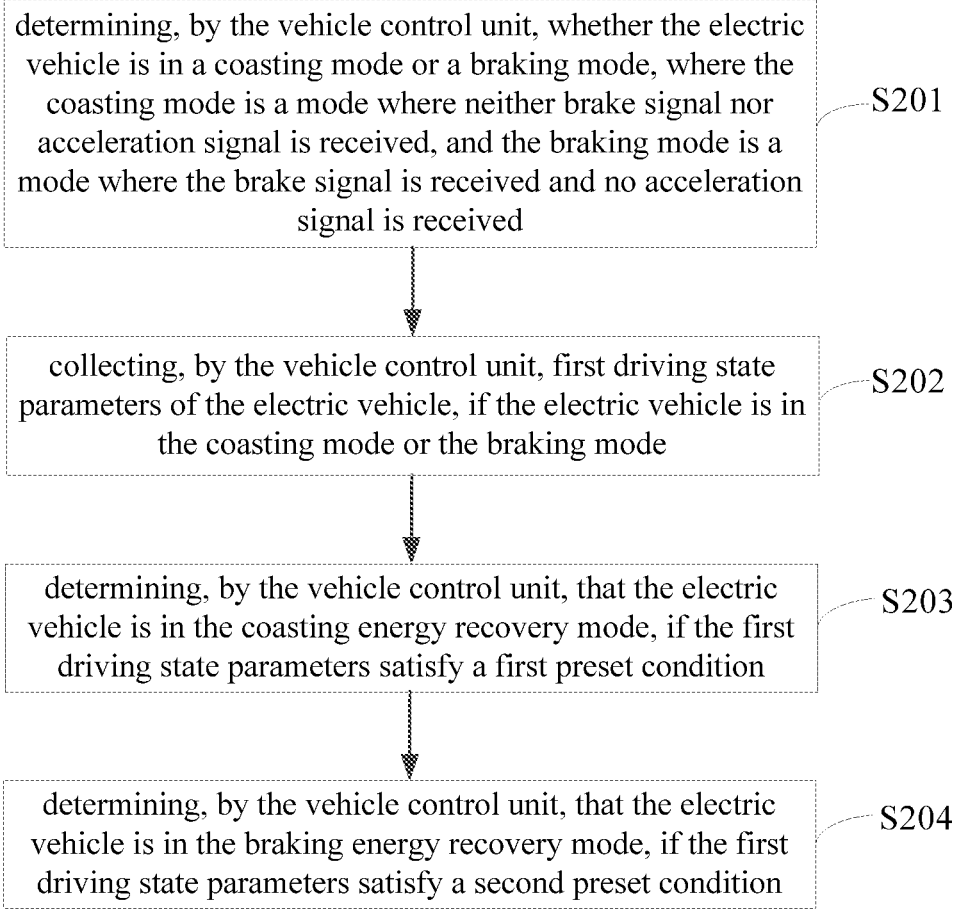
FIG. 2 is a schematic flowchart of a method for controlling energy recovery provided by another embodiment of the present application.

How to determine whether the electric vehicle is in the coasting energy recovery mode or the braking energy recovery mode may refer to FIG. 2, which is a schematic flowchart of a method for controlling energy recovery provided by another embodiment of the present application. On the basis of the embodiment as shown in FIG. 1, step S101 is described in detail in this embodiment. Specifically, the determination whether an electric vehicle is in a coasting energy recovery mode or a braking energy recovery mode comprises: steps S201, S202, S203, and S204.

In step S201, it is determined whether the electric vehicle is in a coasting mode or a braking mode, in which, the coasting mode is a mode where neither brake signal nor acceleration signal is received, and the braking mode is a mode where the brake signal is received and no acceleration signal is received.

In this embodiment, when determining whether the electric vehicle is in the coasting energy recovery mode or the braking energy recovery mode, it is firstly determined whether the electric vehicle is in the coasting mode or the braking mode, because when the electric vehicle is in the coasting mode, it is possible to enter the coasting energy recovery mode, and when the electric vehicle is in the braking mode, it is possible to enter the braking energy recovery mode.

When the VCU receive neither the brake signal nor the acceleration signal, it means that the electric vehicle is in the coasting mode, and when the VCU receives the brake signal and does not receive the acceleration signal, it means that the electric vehicle is in the braking mode.

In step S202, if the electric vehicle is in the coasting mode or the braking mode, first driving state parameters of the electric vehicle is collected.

In this embodiment, when it is detected by the VCU that the electric vehicle is in the coasting mode or the braking mode, the first driving state parameters of the electric vehicle are started to be collected.

Optionally, if the electric vehicle does not include the electronic stability program, the first driving state parameters comprise: a fault level, a vehicle speed, a vehicle driving direction, a gear direction, and a brake pedal opening degree. If the electric vehicle contains the electronic stability program, the first driving state parameters comprise: the fault level, a state of the electronic stability program, the vehicle speed, the vehicle driving direction, the gear direction, the brake pedal opening degree.

Specifically, the electronic stability program (ESP), including an antilock braking system (ABS) and an acceleration slip regulation (ASR), is a functional extension of the two systems. The ESP system consists of a control unit and a steering sensor (configured for monitoring a steering angle of a steering wheel), a wheel sensor (configured for monitoring the speed and rotation of each wheel), a side slip sensor (configured for monitoring a state of the vehicle body rotating around the vertical axis), a lateral acceleration sensor (configured for monitoring a centrifugal force when the car turns), and the like. The control unit judges the operation state of the vehicle through the signals sent from these sensors, and then sends out control commands Compared the vehicle containing the ESP with the vehicle only containing the ABS and the ASR, the difference is that the ABS and the ASR can only react passively, while the ESP can detect and analyze vehicle conditions and correct driving errors to prevent problems before their occurrence.

Therefore, in the case that the electric vehicle is not provided with the electronic stability program, the VCU can collect the fault level, the vehicle speed, the vehicle driving direction, the gear direction, the brake pedal opening degree of the electric vehicle. In the case that the electric vehicle is provided with the electronic stability program, the VCU can collect the fault level, the state of the electronic stability program, the vehicle speed, the vehicle driving direction, the gear direction, and the brake pedal opening degree of the electric vehicle.

In step S203, if the first driving state parameters satisfy a first preset condition, it is determined that the electric vehicle is in the coasting energy recovery mode.

If the electric vehicle does not contain an electronic stability program, the first preset condition is as follows: the fault level is level 2 or below, a gear is a forward gear, a vehicle speed is within a range of a first preset threshold, and the vehicle driving direction is consistent with the gear direction. If the electric vehicle contains the electronic stability program, the first preset condition is as follows: the fault level is level 2 or below, the electronic stability program is in an inactivated sate, the gear is the forward gear, the vehicle speed is within the range of the first preset threshold, and the vehicle driving direction is consistent with the gear direction.

Specifically, when the vehicle is normally started with a high voltage, the whole vehicle has no fault of level 3 or above, the ESP function is not activated, the gear is the forward gear, the vehicle speed reaches a certain threshold, the vehicle driving direction is consistent with the gear direction, and the vehicle can automatically enter the coasting energy recovery mode.

In step S204, if the first driving state parameters satisfy a second preset condition, it is determined that the electric vehicle is in the braking energy recovery mode.

If the electric vehicle does not contain the electronic stability program, the second preset condition is as follows: the fault level is level 2 or below, the gear is the forward gear, the vehicle speed is within a range of a second preset threshold, the vehicle driving direction is consistent with the gear direction, and the brake pedal opening degree is within a range of a third preset threshold. If the electric vehicle contains the electronic stability program, the second preset condition is as follows: the fault level is level 2 or below, the electronic stability program is in the inactivated sate, the gear is the forward gear, the vehicle speed is within the range of the second preset threshold, the vehicle driving direction is consistent with the gear direction, and the brake pedal opening degree is within the range of the third preset threshold.

Specifically, when the vehicle is normally started with a high voltage, the whole vehicle has no fault of level 3 or above, the ESP function is not activated, the gear is the forward gear, the vehicle speed reaches a certain threshold, and the vehicle driving direction is consistent with the gear direction. When the driver presses the brake pedal with a certain depth, the vehicle can automatically enter the braking energy recovery mode. The first preset threshold value and the second preset threshold value may be equal or may not be equal, and may be calibrated according to the performance of a specific vehicle, which are not limited here.

Figure 3:
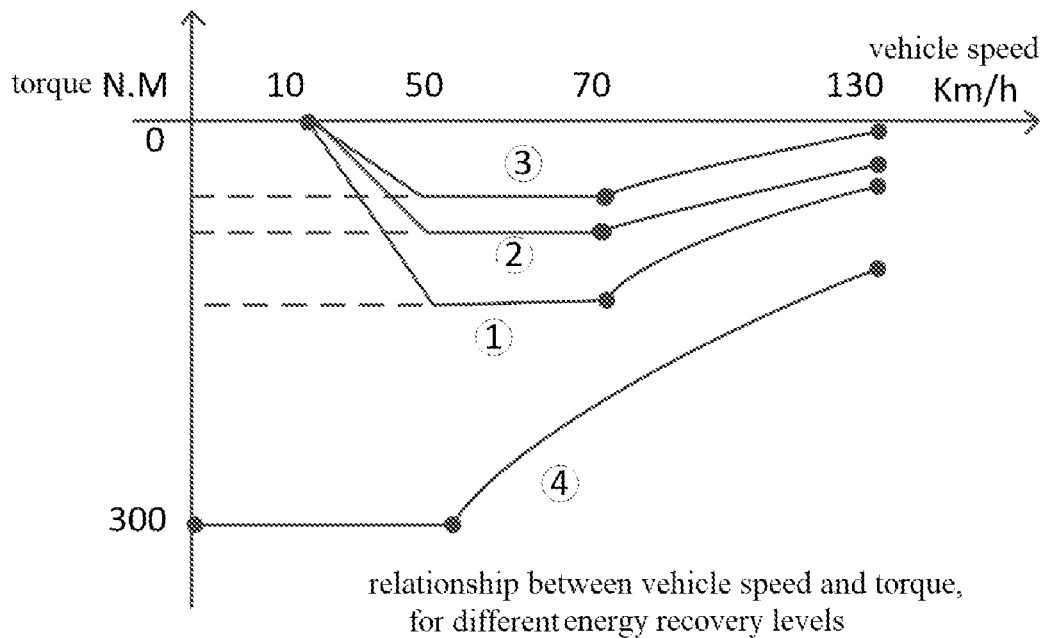
FIG. 3 is a schematic diagram of a method for controlling energy recovery provided by an embodiment of the present application.
Figure 4:
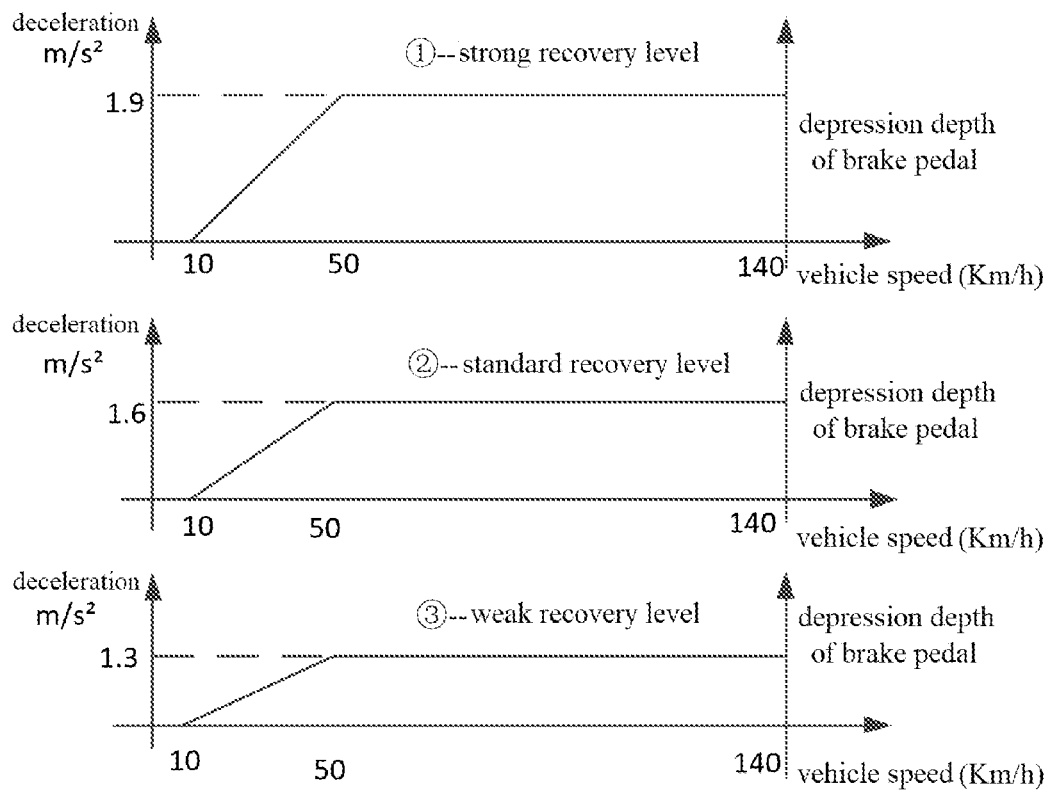
FIG. 4 is a schematic diagram of a method for controlling energy recovery provided by another embodiment of the present application.

In practical applications, when the vehicle enters the energy recovery mode (the coasting energy recovery mode or the braking energy recovery mode), 3 levels, that is, strong, standard, and weak, may be divided into, according to the driver's needs. As shown in a combination of FIGS. 3-4, ① in FIG. 3 represents the relationship between the vehicle speed and the torque corresponding to the strong recovery level; ② in FIG. 3 represents the relationship between the vehicle speed and the torque corresponding to the standard recovery level; ③ in FIG. 3 represents the relationship between the vehicle speed and the torque corresponding to the weak recovery level; ④ in FIG. 3 represents the relationship between the vehicle speed and THE torque corresponding to the motor peak recovery torque; ① in FIG. 4 represents the relationship between the vehicle speed and the deceleration corresponding to the strong recovery level; ② in FIG. 4 represents the relationship between the vehicle speed and the deceleration corresponding to the standard recovery level; and ③ in FIG. 4 represents the relationship between the vehicle speed and the deceleration corresponding to the weak recovery level. The values of the abscissa and the ordinate in FIGS. 3-4 are all initialized values, and these values are all configurable, that is, TBD, indicating calibratable or configurable.

That is, in the case of the same pedal opening degree and vehicle speed, the corresponding recovery torque is also different. The VCU can collect the first driving state parameters, namely the fault level, the state of the electronic stability program, the vehicle speed, the vehicle driving direction, the gear direction, and the brake pedal opening degree in real time, and obtain the energy recovery torque corresponding to the current energy recovery mode based on the collected first driving state parameters.

How to achieve the acquisition of the energy recovery torque of the electric vehicle may refer to FIG. 5, which is a schematic flowchart of a method for controlling the energy recovery provided by another embodiment of the present application. On the basis of the above embodiments, for example, on the basis of the embodiments as shown in FIG. 2, this embodiment describes the step S102 in details. If the electric is in the coasting energy recovery mode or the braking energy recovery mode, the acquisition of an energy recovery torque of the electric vehicle comprises steps S501, S502, S503, and S504.

In step S501, if the electric vehicle is in the coasting energy recovery mode or the braking energy recovery mode, second driving state parameters of the electric vehicle are collected, in which, the second driving state parameters comprises: an accelerator opening degree signal, a recovery strength signal, a driving mode signal, and a vehicle speed signal.

In this embodiment, after it is determined that the electric vehicle is in the coasting energy recovery mode or the braking energy recovery mode, the VCU starts to collect the second driving state parameters of the electric vehicle, that is, the accelerator pedal opening degree signal, the recovery strength signal, the driving mode signal, and the vehicle speed signal.

In step S502, if the electric vehicle is in the coasting energy recovery mode, according to the second driving state parameters, a coasting energy recovery torque corresponding to the second driving state parameters is searched for in in a preset table of coasting energy recovery torques.

In this embodiment, if the electric vehicle is in the coasting energy recovery mode, regardless of whether or not the electric vehicle is provided with the electronic stability program, the coasting energy recovery torque corresponding to the second driving state parameters can be searched out from the preset table of coasting energy recovery torques.

The preset table of coasting energy recovery torques is configured in the MAP table 1 in the MATLAB, and the MAP table 1 stores the coasting energy recovery torque matching with the accelerator pedal opening degree signal, the energy recovery strength signal, the driving mode signal, the vehicle speed signal, and the second driving state parameters. When the VCU collects the second driving state parameters of the electric vehicle in the current driving state, a matching coasting energy recovery torque is searched out and acquired from the MAP table 1 (that is, the preset table of coasting energy recovery torques) according to the preset first access path. In such condition, due to in the absence of braking, the coasting energy recovery torque can be used as the recovery energy torque of the electric vehicle.

In step S503, if the electric vehicle is in the braking energy recovery mode and the electric vehicle is in the absence of the electronic stability program, according to the second driving state parameters, a braking energy recovery torque corresponding to the second driving state parameters is searched for in a preset table of braking energy recovery torques.

In step S504, if the electric vehicle is in the braking energy recovery mode and the electric vehicle contains the electronic stability program, the braking energy recovery torque sent from the electronic stability program is received; in which, the energy recovery torque is a sum of the coasting energy recovery torque and the braking energy recovery torque.

In this embodiment, if the electric vehicle is in the braking energy recovery mode, the obtaining of the braking energy recovery torque corresponding to the second driving state parameters can be implemented as follows:

Mode 1: When the electric vehicle is in the braking energy recovery mode and the electric vehicle is not configured with the ESP, the obtaining of the braking energy recovery torque is similar to the above-mentioned acquisition method of the coasting energy recovery torque, both of which are achieved by table lookup. Specifically, the preset table of braking energy recovery torques is configured in a MAP table 2 in the MATLAB, and the MAP table 2 stores the accelerator pedal opening degree signal, the energy recovery strength signal, the driving mode signal, the vehicle speed signal, and the accelerator pedal opening degree signal. When the VCU collects the second driving state parameters of the electric vehicle in the current driving state, the braking energy recovery torque matching with the second driving state parameters are searched out from the MAP Table 2 (that is, the preset table of braking energy recovery torque), according to a preset second access path.

Mode 2: when the electric vehicle is in the braking energy recovery mode and the electric vehicle is configured with ESP, the ESP can directly collect the braking energy recovery torque in real time, and send the collected braking energy recovery torque to the VCU, and the VCU receives the braking energy recovery torque collected by ESP.

In practical applications, when the VCU obtains the braking energy recovery torque, the braking energy recovery torque is superimposed on the coasting energy recovery torque to obtain the energy recovery torque of the electric vehicle. This calculation method or control method can realize smooth switching between the coasting recovery mode and the braking recovery mode, avoiding vehicle instability and poor safety caused by emergency braking.

Figure 6:
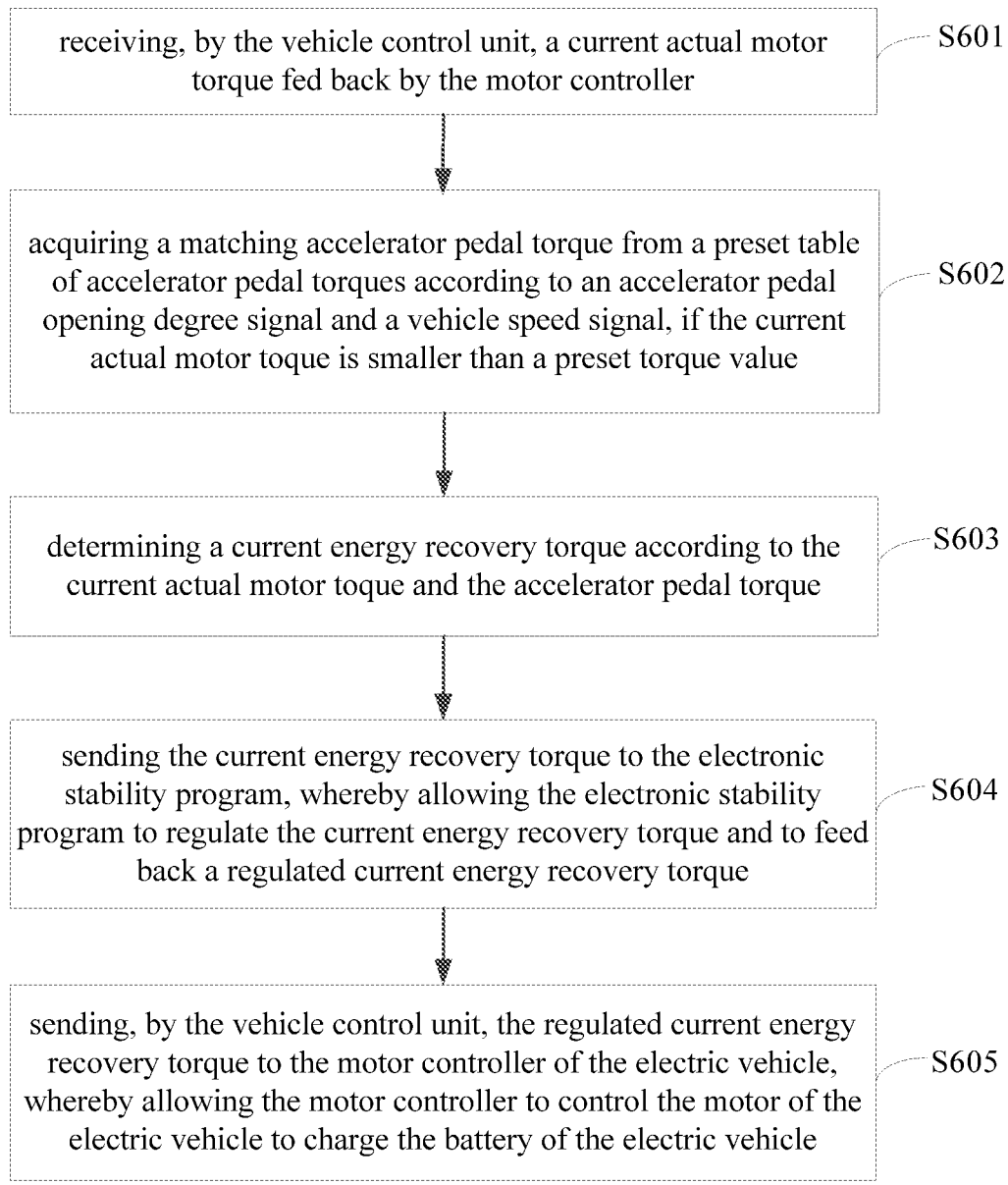
FIG. 6 is a schematic flowchart of a method for controlling energy recovery provided by still another embodiment of the present application.

When the electric vehicle is in the braking energy recovery mode and the electric vehicle contains the electronic stability program, the ESP can adjust parameters in real time, effectively feeds back the current braking torque of the electric vehicle, so as to maximize energy recovery and ensure the stability of the vehicle. As shown in FIG. 6, which is a schematic flowchart of a method for controlling energy recovery provided by another embodiment of the present application. In this embodiment, the method for controlling energy recovery is described in detail on the basis of the above-mentioned embodiment, for example, on the basis of the embodiment as shown in FIG. 5.

If the electric vehicle is in the braking energy recovery mode and the electric vehicle contains the electronic stability program, after sending the energy recovery torque to the motor controller of the electric vehicle, the method further comprises: steps S601, S602, S603, S604, and S605.

In step S601, a current actual motor torque is fed back by the motor controller is received.

In step S602, if the current actual motor toque is smaller than a preset torque value, a matching accelerator pedal torque is acquired from a preset table of accelerator pedal torques according to an accelerator pedal opening degree signal and a vehicle speed signal.

In step S603, it is determined a current energy recovery torque according to the current actual motor toque and the accelerator pedal torque.

In step S604, the current energy recovery torque is sent to the electronic stability program, whereby allowing the electronic stability program to regulate the current energy recovery torque and to feed back a regulated current energy recovery torque.

In step S605, the regulated current energy recovery torque is sent to the motor controller of the electric vehicle, whereby allowing the motor controller to control the motor of the electric vehicle to charge the battery of the electric vehicle.

In this embodiment, in condition that the electric vehicle is in the braking energy recovery mode and the electric vehicle contains the electronic stability program, after the VCU receives the braking energy recovery torque sent from the electronic stability program, as well as after step S103, in which the energy recovery torque is sent to the motor controller of the electric vehicle, whereby allowing the motor controller to control the motor of the electric vehicle to charge the battery of the electric vehicle, the current actual motor toque needs to be adjusted, so as to maximize the energy recovery and ensure the vehicle stability.

Specifically, when the vehicle enters the energy recovery mode, the energy recovery torque is the sum of the braking recovery torque and the coasting energy recovery torque. If the vehicle is equipped with the ESP function, the braking recovery torque is sent by the ESP. If the vehicle is not equipped with the ESP function, the braking recovery torque is obtained by looking up the table (for example, the MAP table 2, that is, the preset table of braking energy recovery torques) via a MAP tool according to the accelerator pedal opening degree signal, the energy recovery strength signal, the driving mode signal, and the vehicle speed signal received by the VCU. The coasting energy recovery torque is obtained by looking up the table according to the pedal opening degree (which can be the accelerator pedal opening degree), energy recovery strength, the driving mode, and the vehicle speed.

In condition that the vehicle is equipped with the ESP function, when the braking energy recovery is activated (that is, entering the braking energy recovery mode) and the current actual motor toque is smaller than 0, the VCU should send the current energy recovery torque to the ESP.

Optionally, the current energy recovery torque is obtained by an absolute value of a difference between the current motor torque and the accelerator pedal torque.

Specifically, the current energy recovery torque is the absolute value of the difference between the current motor torque and the accelerator pedal torque.

In this embodiment, the calculation formula of the current energy recovery torque value is as follows:

Current energy recovery torque=|Current actual motor toque—Accelerator pedal torque|.

In practical applications, 1) when the accelerator pedal request torque (that is, the accelerator pedal torque) is greater than 0, the accelerator pedal torque is 0; 2) when the current actual motor toque (TM_ActTrq)—the accelerator pedal torque is greater than 0, the current The recovery torque is 0; and 3) when the braking energy recovery is not activated (that is, the electric vehicle does not enter the braking energy recovery mode) or the current actual motor toque is greater than or equal to 0, the current energy recovery torque is 0. When the energy recovery is disabled, the energy recovery torque should be 0.

Specifically, after obtaining the current energy recovery torque, the VCU sends the current energy recovery torque to the electronic stability program, so that the electronic stability program adjusts the current energy recovery torque and feeds back the regulated current energy recovery torque. Thereafter, the VCU sends the regulated current energy recovery torque to the motor controller of the electric vehicle, so that the motor controller controls the motor of the electric vehicle to charge the battery of the electric vehicle.

In this embodiment, the method of determining the entry of the energy recovery mode and calculating the energy recovery torque includes entry conditions, torque calculation, and the like. By dividing the energy recovery into a braking part and a coasting part, and using the superposition method to calculate the energy recovery torque, the later calibration (configuration) can be more convenient, which makes the switching of the vehicle between the two energy recovery modes much smoother, reduces the vehicle turbulence, and improves the driving experience.

Figure 7:
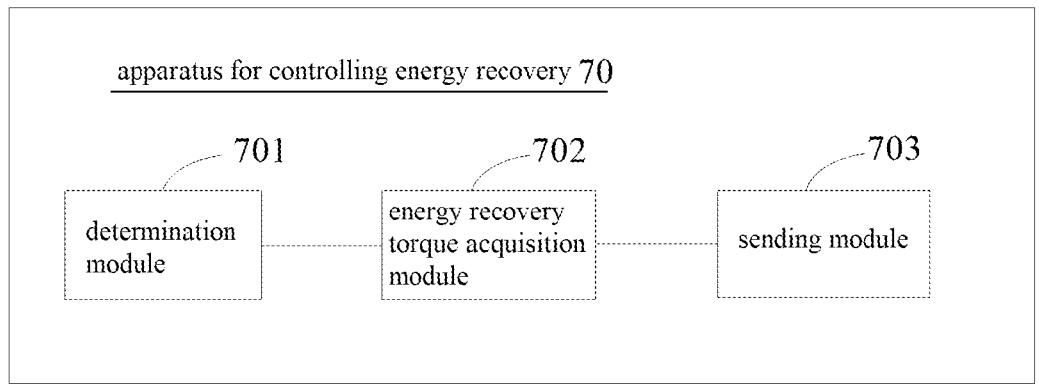
FIG. 7 is a schematic block diagram of an apparatus for controlling energy recovery provided by an embodiment of the present application.

In order to realize the above method for controlling energy recovery, embodiments of the present application provide an apparatus for controlling energy recovery. As show in FIG. 7, which is a schematic structure diagram of an apparatus for controlling energy recovery, the apparatus for controlling energy recovery comprises: a determination module 701, an energy recovery torque acquisition module 702, and a sending module 703. The determination module 701 is configured for determining whether an electric vehicle is in a coasting energy recovery mode or a braking energy recovery mode. The energy recovery torque acquisition module 702 is configured for acquiring an energy recovery torque of the electric vehicle if the electric is in the coasting energy recovery mode or the braking energy recovery mode. The sending module 703 is configured for sending the energy recovery torque to a motor controller of the electric vehicle, whereby allowing the motor controller to control a motor of the electric vehicle to charge a battery of the electric vehicle.

In this embodiment, by configuring the determination module 701, the energy recovery torque acquisition module 702, and the sending module 703, it is firstly determined whether the electric vehicle is in the coasting energy recovery mode or the braking energy recovery mode. Only when the electric vehicle enters the energy recovery mode, the energy recovery can be better performed. If the electric vehicle is in the coasting energy recovery mode or the braking energy recovery mode, the energy recovery torque of the electric vehicle is obtained, the energy recovery torque is sent to the motor controller of the electric vehicle, so that the motor controller controls the electric motor of the electric vehicle to charge the battery of the electric vehicle. In this way, both the coasting and braking energy recovery modes can be better combined, so as to maximize the energy recovery. By determining whether the electric vehicle is in the coasting energy recovery mode or the braking energy recovery mode, this technical solution can better combine both the coasting and braking energy recovery modes, thus maximizing the energy recovery.

The apparatus provided by this embodiment of the present application may be configured to execute the technical solution of the above-described method embodiment. As their implementation principle and technical effect are similar, the implementation principle and the technical effect will not be repeated herein in this embodiment.

In an optional implementation, the determination module is specifically configured for:

determining whether the electric vehicle is in a coasting mode or a braking mode, in which, the coasting mode is a mode where neither brake signal nor acceleration signal is received, and the braking mode is a mode where the brake signal is received and no acceleration signal is received; collecting first driving state parameters of the electric vehicle, if the electric vehicle is in the coasting mode or the braking mode; determining that the electric vehicle is in the coasting energy recovery mode, if the first driving state parameters satisfy a first preset condition; and determining that the electric vehicle is in the braking energy recovery mode, if the first driving state parameters satisfy a second preset condition.

In an optional implementation, the energy recovery torque acquisition module is specifically configured for:

collecting second driving state parameters of the electric vehicle if the electric vehicle is in the coasting energy recovery mode or the braking energy recovery mode, wherein the second driving state parameters comprises: an accelerator opening degree signal, an energy recovery strength signal, a driving mode signal, and a vehicle speed signal; searching, according to the second driving state parameters, in a preset table of coasting energy recovery torques for a coasting energy recovery torque corresponding to the second driving state parameters, when the electric vehicle is in the coasting energy recovery mode; searching, according to the second driving state parameters, in a preset table of braking energy recovery torques for a braking energy recovery torque corresponding to the second driving state parameters, when the electric vehicle is in the braking energy recovery mode and the electric vehicle is in the absence of the electronic stability program; and receiving the braking energy recovery torque sent from the electronic stability program, when the electric vehicle is in the braking energy recovery mode and the electric vehicle contains the electronic stability program; in which, the energy recovery torque is a sum of the coasting energy recovery torque and the braking energy recovery torque.

Figure 8:
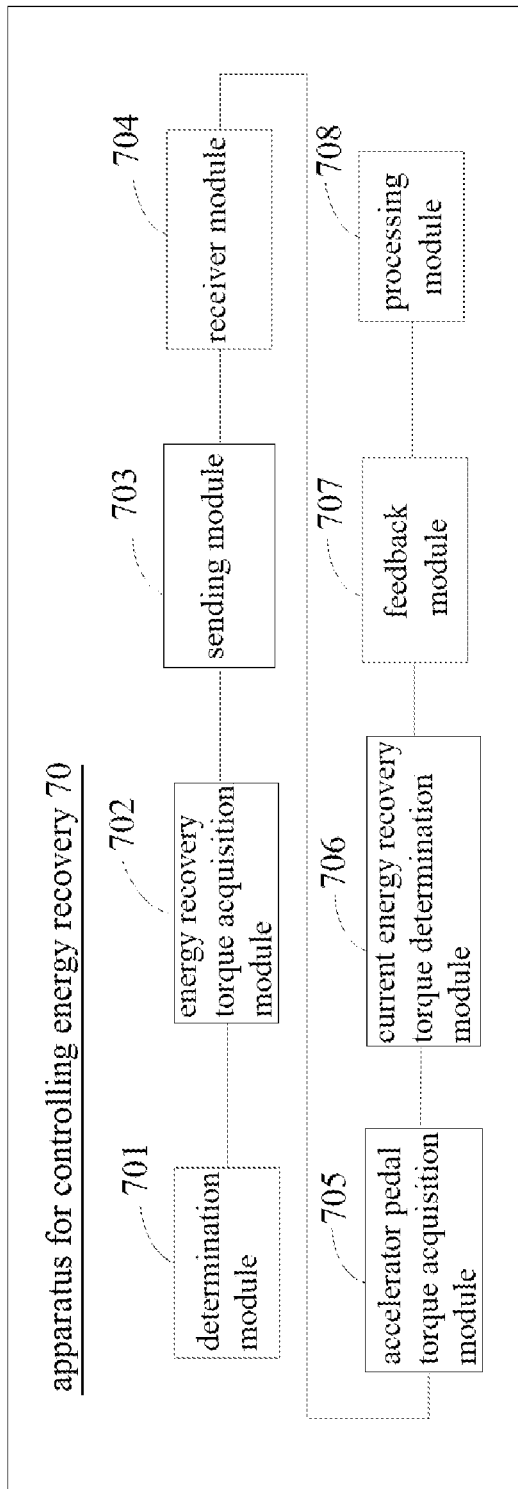
FIG. 8 is a schematic block diagram of an apparatus for controlling energy recovery provided by another embodiment of the present application.

FIG. 8 is a schematic structure diagram of an apparatus for controlling energy recovery provided by another embodiment of the present. The apparatus further comprises: a receiver module 704, an accelerator pedal torque acquisition module 705, a current energy recovery torque determination module 706, a feedback module 707, and a processing module 708. The receiver module 704 is configured for receiving a current actual motor torque fed back by the motor controller. The accelerator pedal torque acquisition module 705 is configured for acquiring a matching accelerator pedal torque from a preset table of accelerator pedal torques according to an accelerator pedal opening degree signal and a vehicle speed signal, when the current actual motor toque is smaller than a preset torque value. The current energy recovery torque determination module 706 is configured for determining a current energy recovery torque according to the current actual motor toque and the accelerator pedal torque. The feedback module 707 is configured for sending the current energy recovery torque to the electronic stability program, whereby allowing the electronic stability program to regulate the current energy recovery torque and to feed back a regulated current energy recovery torque. The processing module 708 is configured for sending the regulated current energy recovery torque to the motor controller of the electric vehicle, whereby allowing the motor controller to control the motor of the electric vehicle to charge the battery of the electric vehicle.

In a possible implementation, the current energy recovery torque is obtained by an absolute value of a difference between the current motor torque and the accelerator pedal torque.

In a possible implementation, if the electric vehicle does not contain an electronic stability program, the first driving state parameters comprise: a fault level, a vehicle speed, a vehicle driving direction, a gear direction, and a brake pedal opening degree; the first preset condition is as follows: the fault level is level 2 or below, a gear is a forward gear, a vehicle speed is within a range of a first preset threshold, and the vehicle driving direction is consistent with the gear direction; and the second preset condition is as follows: the fault level is level 2 or below, the gear is the forward gear, the vehicle speed is within a range of a second preset threshold, the vehicle driving direction is consistent with the gear direction, and the brake pedal opening degree is within a range of a third preset threshold. If the electric vehicle contains the electronic stability program, the first driving state parameters comprise: the fault level, a state of the electronic stability program, the vehicle speed, the vehicle driving direction, the gear direction, and the brake pedal opening degree; the first preset condition is as follows: the fault level is level 2 or below, the electronic stability program is in an inactivated sate, the gear is the forward gear, the vehicle speed is within the range of the first preset threshold, and the vehicle driving direction is consistent with the gear direction; and the second preset condition is as follows: the fault level is level 2 or below, the electronic stability program is in the inactivated sate, the gear is the forward gear, the vehicle speed is within the range of the second preset threshold, the vehicle driving direction is consistent with the gear direction, and the brake pedal opening degree is within the range of the third preset threshold.

In this embodiment, the method of determining the entry of the energy recovery mode and calculating the energy recovery torque includes entry conditions, torque calculation, and the like. By dividing the energy recovery into a braking part and a coasting part, and using the superposition method to calculate the energy recovery torque, the later calibration (configuration) can be more convenient, which makes the switching of the vehicle between the two energy recovery modes much smoother, reduces the vehicle turbulence, and improves the driving experience.

In order to realize the method for controlling the energy recovery, embodiments of the present application provides a controller, which is configured to execute the method for controlling the energy recovery according to above embodiments, which may refer to related description in the above-described method embodiments.

In this embodiment, it is firstly determined by the controller whether the electric vehicle is in the coasting energy recovery mode or the braking energy recovery mode. Only when the electric vehicle enters the energy recovery mode, the energy recovery can be better performed. If the electric vehicle is in the coasting energy recovery mode or the braking energy recovery mode, the energy recovery torque of the electric vehicle is obtained, the energy recovery torque is sent to the motor controller of the electric vehicle, so that the motor controller controls the electric motor of the electric vehicle to charge the battery of the electric vehicle. In this way, both the coasting and braking energy recovery modes can be better combined, so as to maximize the energy recovery. By determining whether the electric vehicle is in the coasting energy recovery mode or the braking energy recovery mode, this technical solution can better combine both the coasting and braking energy recovery modes, thus maximizing the energy recovery.

The controller provided by this embodiment of the present application may be configured to execute the technical solution of the above-described method embodiment. As their implementation principle and technical effect are similar, the implementation principle and the technical effect will not be repeated herein in this embodiment.

Embodiments of the present application further provide an electric vehicle, which comprises the above-described controller.

The electric vehicle provided by this embodiment of the present application may be configured to execute the technical solution of the above-described method embodiment by adopting a controller. As their implementation principle and technical effect are similar, the implementation principle and the technical effect will not be repeated herein in this embodiment.

Figure 9:
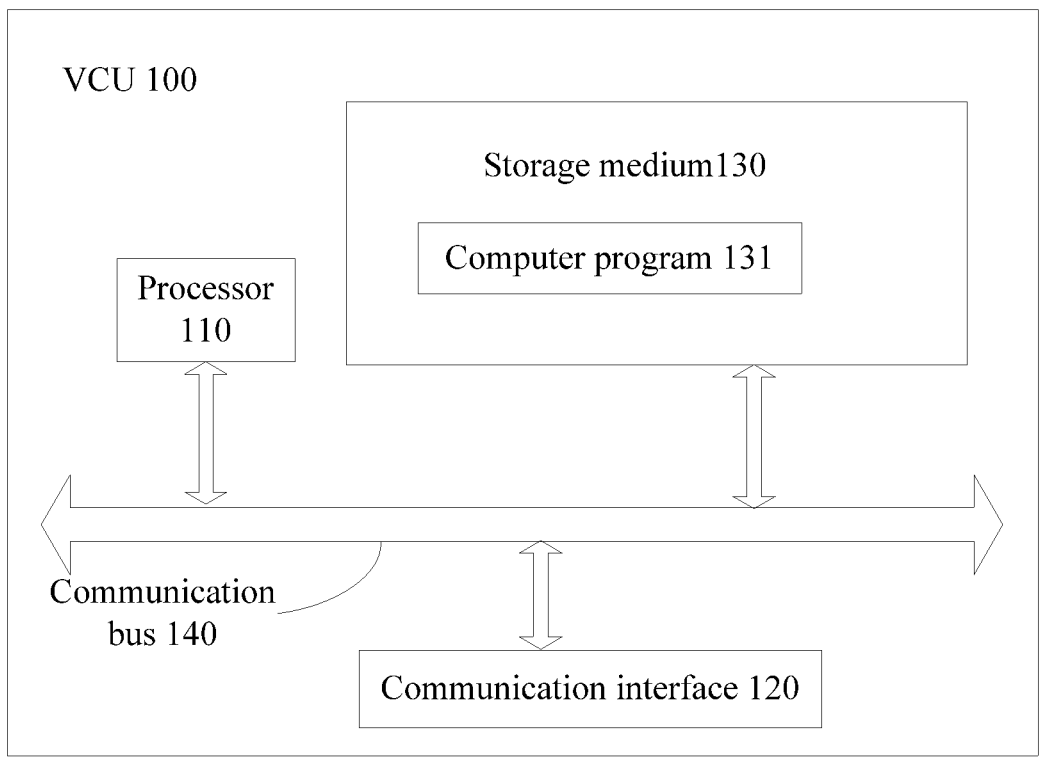
FIG. 9 is a schematic block diagram of a vehicle control unit provided by an embodiment of the present application.

Embodiments of the present application further provide a VUC 100, which comprises: a processor 110, a communication interface 120, a storage medium 130, and a communication bus 140, as shown in FIG. 9. The processor 110, the communication interface 120, the storage medium 130 are communicated with one another via the communication bus 140. The storage medium 130 stores a computer program 131, which when being executed by the processor, cause the processor to implement the above-described method for controlling energy recovery.

In this embodiment, the method of determining the entry of the energy recovery mode and calculating the energy recovery torque includes entry conditions, torque calculation, and the like. By dividing the energy recovery into a braking part and a coasting part, and using the superposition method to calculate the energy recovery torque, the later calibration (configuration) can be more convenient, which makes the switching of the vehicle between the two energy recovery modes much smoother, reduces the vehicle turbulence, and improves the driving experience.

As will be appreciated by those skilled in the art, the embodiments of the present application may be provided as a method, an apparatus, or a computer program product. Therefore, the present application may take the form of an entirely hardware embodiment, an entirely software embodiment, or an embodiment combining software and hardware aspects. Furthermore, the present application may take the form of a computer program product implemented in one or more computer-usable storage media (including, but not limited to, a disk storage, a CD-ROM, an optical storage, etc.) containing computer-usable program codes therein.

The present application is described with reference to flowcharts and/or block diagrams of methods, devices (systems), and computer program products according to embodiments of the present application. It will be understood that each process and/or block in the flowcharts and/or block diagrams, and combinations of processes and/or blocks in the flowcharts and/or block diagrams, can be implemented by computer program instructions. These computer program instructions may be provided to the processor of a general purpose computer, special purpose computer, embedded processor, or other programmable data processing device to produce a machine, so as to produce a means configured for implementing functions specified in one or more processes in each flowchart and/or one or more blocks in each block diagram by instructions executed by processors of the computer or other programmable data processing device.

These computer program instruct tons may also be stored in a computer-readable memory capable of directing a computer or other programmable data processing device to work in a particular manner, such that the instructions stored in the computer-read able memory produce an article of manufacture comprising instruction apparatus. The instruction apparatus implements the functions specified in one or more processes of the flowcharts and/or one or more blocks of the block diagrams.

These computer program instructions can also be loaded on a computer or other programmable data processing device to cause a series of operational steps to be performed on the computer or other programmable device to produce a computer-implemented process, such that the instructions executed on the computer or other programmable data processing device provide steps for implementing the functions specified in one or more processes of the flowcharts and/or one or more blocks of the block diagrams.

In a typical configuration, a computing device includes one or more processors (CPUs), input/output interfaces, network interfaces, and memories.

The memory may include a non-persistent memory in a computer readable medium, a random access memory (RAM) and/or a non-volatile memory, such as a read only memory (ROM) or a flash memory (flash RAM). The memory is an example of a computer-readable medium.

The computer-readable medium includes both persistent and non-permanent, removable and non-removable media, and may realize the storage of information by any method or technology. Information may be computer readable instructions, data structures, module s of programs, or other data. The machine-readable storage medium includes, but is not limited to, a phase-change memory (PRAM), a static random access memory (SRAM), a dynamic random access memory (DRAM), other types of random access memories (RAM), an only read-only memory (ROM), an electrically erasable programmable read-only memory (EEPROM), a flash memory, or other memory technologies, a compact disc read-only memory (CD-ROM), a digital versatile disc (DVD) or other optical storage, magnetic cassette tapes, magnetic tape-disc storage or other magnetic storage devices, and various other media that can store program code.

Finally, it should be noted that the above embodiments are only used to illustrate, rather than to limit, the technical solutions of the present application. Although the present application has been described in detail with reference to the foregoing embodiments, those skilled in the art should understand that the technical solutions described in the foregoing embodiments can still be modified, or some or all of the technical features thereof can be equivalently replaced; and these modifications or replacements do not make the essence of the corresponding technical solutions deviate from the scope of the technical solutions of the embodiments of the present application.

What is claimed is:

1. A method for controlling energy recovery, being applied to an electric vehicle, and the method comprising:
    determining, by a vehicle control unit, whether the electric vehicle is in a coasting energy recovery mode or a braking energy recovery mode;
    acquiring, by the vehicle control unit, an energy recovery torque of the electric vehicle if the electric is in the coasting energy recovery mode or the braking energy recovery mode; and
    sending, by the vehicle control unit, the energy recovery torque to a motor controller of the electric vehicle, whereby allowing the motor controller to control a motor of the electric vehicle to charge a battery of the electric vehicle;

wherein if the electric vehicle is in the braking energy recovery mode and the electric vehicle contains an electronic stability program, after sending the energy recovery torque to the motor controller of the electric vehicle, the method further comprises:

receiving, by the vehicle control unit, a current actual motor torque fed back by the motor controller;

acquiring a matching accelerator pedal torque from a preset table of accelerator pedal torques according to an accelerator pedal opening degree signal and a vehicle speed signal, if the current actual motor toque is smaller than a preset torque value;

determining a current energy recovery torque according to the current actual motor toque and the accelerator pedal torque;

sending the current energy recovery torque to the electronic stability program, whereby allowing the electronic stability program to regulate the current energy recovery torque and to feed back a regulated current energy recovery torque; and sending, by the vehicle control unit, the regulated current energy recovery torque to the motor controller of the electric vehicle, whereby allowing the motor controller to control the motor of the electric vehicle to charge the battery of the electric vehicle.

2. The method of claim 1, wherein said determining, by the vehicle control unit, whether the electric vehicle is in a coasting energy recovery mode or a braking energy recovery mode comprises:

determining, by the vehicle control unit, whether the electric vehicle is in a coasting mode or a braking mode, wherein the coasting mode is a mode where neither brake signal nor acceleration signal is received, and the braking mode is a mode where the brake signal is received and no acceleration signal is received;

collecting, by the vehicle control unit, first driving state parameters of the electric vehicle, if the electric vehicle is in the coasting mode or the braking mode;

determining, by the vehicle control unit, that the electric vehicle is in the coasting energy recovery mode, if the first driving state parameters satisfy a first preset condition; and determining, by the vehicle control unit, that the electric vehicle is in the braking energy recovery mode, if the first driving state parameters satisfy a second preset condition;

wherein, if the electric vehicle does not contain the electronic stability program, the first driving state parameters comprise: a fault level, a vehicle speed, a vehicle driving direction, a gear direction, and a brake pedal opening degree; the first preset condition is as follows: the fault level is level 2 or below, a gear is a forward gear, a vehicle speed is within a range of a first preset threshold, and the vehicle driving direction is consistent with the gear direction; and the second preset condition is as follows: the fault level is level 2 or below, the gear is the forward gear, the vehicle speed is within a range of a second preset threshold, the vehicle driving direction is consistent with the gear direction, and the brake pedal opening degree is within a range of a third preset threshold; and wherein, if the electric vehicle contains the electronic stability program, the first driving state parameters comprise: the fault level, a state of the electronic stability program, the vehicle speed, the vehicle driving direction, the gear direction, and the brake pedal opening degree; the first preset condition is as follows: the fault level is level 2 or below, the electronic stability program is in an inactivated state, the gear is the forward gear, the vehicle speed is within the range of the first preset threshold, and the vehicle driving direction is consistent with the gear direction; and the second preset condition is as follows: the fault level is level 2 or below, the electronic stability program is in the inactivated state, the gear is the forward gear, the vehicle speed is within the range of the second preset threshold, the vehicle driving direction is consistent with the gear direction, and the brake pedal opening degree is within the range of the third preset threshold.

3. The method of claim 1, wherein said acquiring, by the vehicle control unit, an energy recovery torque of the electric vehicle if the electric is in the coasting energy recovery mode or the braking energy recovery mode comprises:

collecting, by the vehicle control unit, second driving state parameters of the electric vehicle if the electric vehicle is in the coasting energy recovery mode or the braking energy recovery mode, wherein the second driving state parameters comprises:

an accelerator opening degree signal, an energy recovery strength signal, a driving mode signal, and a vehicle speed signal; and determining, by the vehicle control unit, the energy recovery torque according to any one of the following:

searching, by the vehicle control unit, according to the second driving state parameters, in a preset table of coasting energy recovery torques for a coasting energy recovery torque corresponding to the second driving state parameters as the energy recovery torque, if the electric vehicle is in the coasting energy recovery mode;

searching, by the vehicle control unit, according to the second driving state parameters, in a preset table of braking energy recovery torques for a braking energy recovery torque corresponding to the second driving state parameters as the energy recovery torque, if the electric vehicle is in the braking energy recovery mode and the electric vehicle does not contain the electronic stability program;

receiving, by the vehicle control unit, the braking energy recovery torque sent from the electronic stability program as the energy recovery torque, if the electric vehicle is in the braking energy recovery mode and the electric vehicle contains the electronic stability program; and superimposing, by the vehicle control unit, the braking energy recovery torque on the coasting energy recovery torque as the energy recovery torque, if the electric vehicle enters the braking energy recovery mode from the coasting energy recovery mode state.

4. The method of claim 3, wherein said superimposing, by the vehicle control unit, the braking energy recovery torque on the coasting energy recovery torque comprises:

gradually superimposing a constantly generated braking energy recovery torque on a coasting energy recovery torque having been generated, along with generation of the braking energy recovery torque.

5. The method of claim 4, wherein the current energy recovery torque is an absolute value of a difference between the current motor torque and the accelerator pedal torque.

6. The method of claim 1, wherein the coasting energy recovery mode and the braking energy recovery mode are configured with different levels of energy recovery associated with a vehicle speed and a brake pedal opening degree.

7. A machine-readable storage medium, storing instructions configured to cause a machine to execute a method for controlling energy recovery, the method being applied to an electric vehicle, and the method comprising:
   determining, by a vehicle control unit, whether the electric vehicle is in a coasting energy recovery mode or a braking energy recovery mode;
   acquiring, by the vehicle control unit, an energy recovery torque of the electric vehicle if the electric is in the coasting energy recovery mode or the braking energy recovery mode; and
   sending, by the vehicle control unit, the energy recovery torque to a motor controller of the electric vehicle, whereby allowing the motor controller to control a motor of the electric vehicle to charge a battery of the electric vehicle;
wherein
   if the electric vehicle is in the braking energy recovery mode and the electric vehicle contains an electronic stability program, after sending the energy recovery torque to the motor controller of the electric vehicle, the method further comprises:
   receiving, by the vehicle control unit, a current actual motor torque fed back by the motor controller;
   acquiring a matching accelerator pedal torque from a preset table of accelerator pedal torques according to an accelerator pedal opening degree signal and a vehicle speed signal, if the current actual motor toque is smaller than a preset torque value;
   determining a current energy recovery torque according to the current actual motor toque and the accelerator pedal torque;
   sending the current energy recovery torque to the electronic stability program, whereby allowing the electronic stability program to regulate the current energy recovery torque and to feed back a regulated current energy recovery torque; and
   sending, by the vehicle control unit, the regulated current energy recovery torque to the motor controller of the electric vehicle, whereby allowing the motor controller to control the motor of the electric vehicle to charge the battery of the electric vehicle.

8. A vehicle control unit, comprising:
   a processor, and
   a storage medium, storing a computer program, which when being executed by the processor, causes the processor to execute a method for controlling energy recovery, the method being applied to an electric vehicle, and the method comprising:
   determining, by the vehicle control unit, whether the electric vehicle is in a coasting energy recovery mode or a braking energy recovery mode;
   acquiring, by the vehicle control unit, an energy recovery torque of the electric vehicle if the electric is in the coasting energy recovery mode or the braking energy recovery mode; and
   sending, by the vehicle control unit, the energy recovery torque to a motor controller of the electric vehicle, whereby allowing the motor controller to control a motor of the electric vehicle to charge a battery of the electric vehicle;
wherein
   if the electric vehicle is in the braking energy recovery mode and the electric vehicle contains an electronic stability program, after sending the energy recovery torque to the motor controller of the electric vehicle, the method further comprises:
   receiving, by the vehicle control unit, a current actual motor torque fed back by the motor controller;
   acquiring a matching accelerator pedal torque from a preset table of accelerator pedal torques according to an accelerator pedal opening degree signal and a vehicle speed signal, if the current actual motor toque is smaller than a preset torque value;
   determining a current energy recovery torque according to the current actual motor toque and the accelerator pedal torque;
   sending the current energy recovery torque to the electronic stability program, whereby allowing the electronic stability program to regulate the current energy recovery torque and to feed back a regulated current energy recovery torque; and
   sending, by the vehicle control unit, the regulated current energy recovery torque to the motor controller of the electric vehicle, whereby allowing the motor controller to control the motor of the electric vehicle to charge the battery of the electric vehicle.

9. The non-transitory machine-readable storage medium of claim 7, wherein said determining, by the vehicle control unit, whether an electric vehicle is in a coasting energy recovery mode or a braking energy recovery mode comprises:
   determining, by the vehicle control unit, whether the electric vehicle is in a coasting mode or a braking mode, wherein the coasting mode is a mode where neither brake signal nor acceleration signal is received, and the braking mode is a mode where the brake signal is received and no acceleration signal is received;
   collecting, by the vehicle control unit, first driving state parameters of the electric vehicle, if the electric vehicle is in the coasting mode or the braking mode;
   determining, by the vehicle control unit, that the electric vehicle is in the coasting energy recovery mode, if the first driving state parameters satisfy a first preset condition; and
   determining, by the vehicle control unit, that the electric vehicle is in the braking energy recovery mode, if the first driving state parameters satisfy a second preset condition;
   wherein, if the electric vehicle does not contain the electronic stability program, the first driving state parameters comprise: a fault level, a vehicle speed, a vehicle driving direction, a gear direction, and a brake pedal opening degree; the first preset condition is as follows: the fault level is level 2 or below, a gear is a forward gear, a vehicle speed is within a range of a first preset threshold, and the vehicle driving direction is consistent with the gear direction; and the second preset condition is as follows: the fault level is level 2 or below, the gear is the forward gear, the vehicle speed is within a range of a second preset threshold, the vehicle driving direction is consistent with the gear direction, and the brake pedal opening degree is within a range of a third preset threshold; and
   wherein, if the electric vehicle contains the electronic stability program, the first driving state parameters comprise: the fault level, a state of the electronic stability program, the vehicle speed, the vehicle driving direction, the gear direction, and the brake pedal opening degree; the first preset condition is as follows: the fault level is level 2 or below, the electronic stability program is in an inactivated state, the gear is the forward gear, the vehicle speed is within the range of the first preset threshold, and the vehicle driving direction is consistent with the gear direction; and the second preset condition is as follows: the fault level is level 2 or below, the electronic stability program is in the inactivated state, the gear is the forward gear, the vehicle speed is within the range of the second preset threshold, the vehicle driving direction is consistent with the gear direction, and the brake pedal opening degree is within the range of the third preset threshold.

10. The non-transitory machine-readable storage medium of claim 7, wherein said acquiring, by the vehicle control unit, an energy recovery torque of the electric vehicle if the electric is in the coasting energy recovery mode or the braking energy recovery mode comprises:
  collecting, by the vehicle control unit, second driving state parameters of the electric vehicle if the electric vehicle is in the coasting energy recovery mode or the braking energy recovery mode, wherein the second driving state parameters comprises: an accelerator opening degree signal, an energy recovery strength signal, a driving mode signal, and a vehicle speed signal; and
  determining, by the vehicle control unit, the energy recovery torque according to any one of the following:
    searching, by the vehicle control unit, according to the second driving state parameters, in a preset table of coasting energy recovery torques for a coasting energy recovery torque corresponding to the second driving state parameters as the energy recovery torque, if the electric vehicle is in the coasting energy recovery mode;
    searching, by the vehicle control unit, according to the second driving state parameters, in a preset table of braking energy recovery torques for a braking energy recovery torque corresponding to the second driving state parameters as the energy recovery torque, if the electric vehicle is in the braking energy recovery mode and the electric vehicle does not contain the electronic stability program;
    receiving, by the vehicle control unit, the braking energy recovery torque sent from the electronic stability program as the energy recovery torque, if the electric vehicle is in the braking energy recovery mode and the electric vehicle contains the electronic stability program; and
    superimposing, by the vehicle control unit, the braking energy recovery torque on the coasting energy recovery torque as the energy recovery torque, if the electric vehicle enters the braking energy recovery mode from the coasting energy recovery mode state.

11. The non-transitory machine-readable storage medium of claim 10, wherein said superimposing, by the vehicle control unit, the braking energy recovery torque on the coasting energy recovery torque comprises:
  gradually superimposing a constantly generated braking energy recovery torque on a coasting energy recovery torque having been generated, along with generation of the braking energy recovery torque.

12. The non-transitory machine-readable storage medium of claim 11, wherein the current energy recovery torque is an absolute value of a difference between the current motor torque and the accelerator pedal torque.

13. The non-transitory machine-readable storage medium of claim 7, wherein the coasting energy recovery mode and the braking energy recovery mode are configured with different levels of energy recovery associated with a vehicle speed and a brake pedal opening degree.

14. The vehicle control unit of claim 8, wherein said determining, by the vehicle control unit, whether an electric vehicle is in a coasting energy recovery mode or a braking energy recovery mode comprises:
  determining, by the vehicle control unit, whether the electric vehicle is in a coasting mode or a braking mode, wherein the coasting mode is a mode where neither brake signal nor acceleration signal is received, and the braking mode is a mode where the brake signal is received and no acceleration signal is received;
  collecting, by the vehicle control unit, first driving state parameters of the electric vehicle, if the electric vehicle is in the coasting mode or the braking mode;
  determining, by the vehicle control unit, that the electric vehicle is in the coasting energy recovery mode, if the first driving state parameters satisfy a first preset condition; and
  determining, by the vehicle control unit, that the electric vehicle is in the braking energy recovery mode, if the first driving state parameters satisfy a second preset condition;
  wherein, if the electric vehicle does not contain the electronic stability program, the first driving state parameters comprise: a fault level, a vehicle speed, a vehicle driving direction, a gear direction, and a brake pedal opening degree; the first preset condition is as follows: the fault level is level 2 or below, a gear is a forward gear, a vehicle speed is within a range of a first preset threshold, and the vehicle driving direction is consistent with the gear direction; and the second preset condition is as follows: the fault level is level 2 or below, the gear is the forward gear, the vehicle speed is within a range of a second preset threshold, the vehicle driving direction is consistent with the gear direction, and the brake pedal opening degree is within a range of a third preset threshold; and
  wherein, if the electric vehicle contains the electronic stability program, the first driving state parameters comprise: the fault level, a state of the electronic stability program, the vehicle speed, the vehicle driving direction, the gear direction, and the brake pedal opening degree; the first preset condition is as follows: the fault level is level 2 or below, the electronic stability program is in an inactivated state, the gear is the forward gear, the vehicle speed is within the range of the first preset threshold, and the vehicle driving direction is consistent with the gear direction; and the second preset condition is as follows: the fault level is level 2 or below, the electronic stability program is in the inactivated state, the gear is the forward gear, the vehicle speed is within the range of the second preset threshold, the vehicle driving direction is consistent with the gear direction, and the brake pedal opening degree is within the range of the third preset threshold.

15. The vehicle control unit of claim 8, wherein said acquiring, by the vehicle control unit, an energy recovery torque of the electric vehicle if the electric is in the coasting energy recovery mode or the braking energy recovery mode comprises:
  collecting, by the vehicle control unit, second driving state parameters of the electric vehicle if the electric vehicle is in the coasting energy recovery mode or the braking energy recovery mode, wherein the second driving state parameters comprises:

an accelerator opening degree signal, an energy recovery strength signal, a driving mode signal, and a vehicle speed signal; and determining, by the vehicle control unit, the energy recovery torque according to any one of the following:

- searching, by the vehicle control unit, according to the second driving state parameters, in a preset table of coasting energy recovery torques for a coasting energy recovery torque corresponding to the second driving state parameters as the energy recovery torque, if the electric vehicle is in the coasting energy recovery mode;
- searching, by the vehicle control unit, according to the second driving state parameters, in a preset table of braking energy recovery torques for a braking energy recovery torque corresponding to the second driving state parameters as the energy recovery torque, if the electric vehicle is in the braking energy recovery mode and the electric vehicle does not contain the electronic stability program;
- receiving, by the vehicle control unit, the braking energy recovery torque sent from the electronic stability program as the energy recovery torque, if the electric vehicle is in the braking energy recovery mode and the electric vehicle contains the electronic stability program; and
- superimposing, by the vehicle control unit, the braking energy recovery torque on the coasting energy recovery torque as the energy recovery torque, if the electric vehicle enters the braking energy recovery mode from the coasting energy recovery mode state.

16. The vehicle control unit of claim 15, wherein said superimposing, by the vehicle control unit, the braking energy recovery torque on the coasting energy recovery torque comprises:

gradually superimposing a constantly generated braking energy recovery torque on a coasting energy recovery torque having been generated, along with generation of the braking energy recovery torque.

17. The vehicle control unit of claim 16, wherein the current energy recovery torque is an absolute value of a difference between the current motor torque and the accelerator pedal torque.

\* \* \* \* \*